US011993488B2

(12) United States Patent
Pahlke et al.

(10) Patent No.: US 11,993,488 B2
(45) Date of Patent: May 28, 2024

(54) PROCESSING SERVICE REQUESTS IN A CONVEYANCE SYSTEM

(71) Applicant: Otis Elevator Company, Farmington, CT (US)

(72) Inventors: Derk Oscar Pahlke, Berlin (DE); Lutz Hentschel, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 1279 days.

(21) Appl. No.: 16/586,084

(22) Filed: Sep. 27, 2019

(65) Prior Publication Data

US 2021/0094797 A1 Apr. 1, 2021

(51) Int. Cl.
*B66B 5/00* (2006.01)
*B66B 1/34* (2006.01)
*B66B 3/00* (2006.01)

(52) U.S. Cl.
CPC .......... *B66B 5/0025* (2013.01); *B66B 1/3423* (2013.01); *B66B 3/002* (2013.01); *B66B 5/0087* (2013.01)

(58) Field of Classification Search
CPC ........... B66B 3/00; B66B 1/34; B66B 5/0025; B66B 5/0018; B66B 5/02; B66B 5/0006; B66B 5/0087; B66B 1/3446; B66B 3/002; B66B 5/00; B66B 27/00
See application file for complete search history.

(56) References Cited

U.S. PATENT DOCUMENTS 6,330,935 B1 12/2001 Systermans
6,516,923 B2 * 2/2003 Lence Barreiro ....... B66B 13/22 187/316
6,543,583 B1 * 4/2003 Lence Barreiro ..... B66B 5/0025 187/316
7,073,633 B2 7/2006 Weinberger et al.
(Continued)

FOREIGN PATENT DOCUMENTS

CN 102923538 A 2/2013
CN 104627769 A 5/2015
(Continued)

OTHER PUBLICATIONS

European Search Report for Application No. 20167000.7; dated Feb. 22, 2021; 8 Pages.
(Continued)

*Primary Examiner* — Marlon T Fletcher
(74) *Attorney, Agent, or Firm* — CANTOR COLBURN LLP

(57) ABSTRACT

A method of processing a service request related to a conveyance system includes receiving the service request related to the conveyance system; determining whether the service request identifies the conveyance system as running or not running; upon determining that the service request identifies the conveyance system as not running determining whether a conveyance system status is accessible; when the conveyance system status is accessible, determining from the conveyance system status whether the conveyance system is operating properly; when the conveyance system status is not accessible, obtaining at least one input from the conveyance system and determining from the at least one input whether the conveyance system is operating properly.

19 Claims, 3 Drawing Sheets

(56) References Cited

U.S. PATENT DOCUMENTS

| | | | | |
|---|---|---|---|---|
| 7,937,283 | B2 | 5/2011 | Tyni et al. | |
| 8,028,807 | B2 | 10/2011 | Deplazes et al. | |
| 9,556,002 | B2 * | 1/2017 | Wilke | B66B 5/0025 |
| 9,580,276 | B2 | 2/2017 | Toutaoui | |
| 9,747,585 | B2 | 8/2017 | Eleid et al. | |
| 2011/0067958 | A1 * | 3/2011 | Schuster | B66B 1/34 187/393 |
| 2011/0315490 | A1 * | 12/2011 | Shi | B66B 5/0025 187/393 |
| 2015/0114764 | A1 | 4/2015 | Taylor et al. | |
| 2018/0086597 | A1 | 3/2018 | Song et al. | |
| 2018/0237261 | A1 * | 8/2018 | Herkel | B66B 5/0031 |
| 2018/0346284 | A1 | 12/2018 | Swami et al. | |
| 2019/0210837 | A1 | 7/2019 | Herkel et al. | |
| 2021/0094797 | A1 * | 4/2021 | Pahlke | B66B 5/0025 |

FOREIGN PATENT DOCUMENTS

| | | | | | |
|---|---|---|---|---|---|
| CN | 103832904 | B | | 3/2016 | |
| CN | 105645209 | A | | 6/2016 | |
| CN | 105731209 | A | | 7/2016 | |
| CN | 105813967 | A | * | 7/2016 | B66B 1/3423 |
| CN | 104555627 | B | | 8/2016 | |
| CN | 106276459 | A | | 1/2017 | |
| CN | 106429689 | A | | 2/2017 | |
| CN | 107298357 | A | | 10/2017 | |
| CN | 107310998 | A | | 11/2017 | |
| CN | 107381268 | A | | 11/2017 | |
| CN | 107555279 | A | | 1/2018 | |
| CN | 107651517 | A | | 2/2018 | |
| CN | 108083044 | A | | 5/2018 | |
| CN | 108357998 | A | | 8/2018 | |
| CN | 108483160 | A | | 9/2018 | |
| CN | 108750848 | A | | 11/2018 | |
| CN | 108821048 | A | | 11/2018 | |
| CN | 109110608 | A | | 1/2019 | |
| CN | 110035969 | A | | 7/2019 | |
| CN | 112573314 | A | * | 3/2021 | B66B 1/30 |
| CN | 110775741 | B | * | 11/2021 | B66B 1/18 |
| DE | 112016006581 | T5 | | 12/2018 | |
| EP | 3798173 | A1 | * | 3/2021 | B66B 1/30 |
| KR | 100240957 | B1 | * | 1/2000 | |
| KR | 20170075267 | A | | 7/2017 | |
| WO | WO-2013012406 | A1 | * | 1/2013 | B66B 1/06 |
| WO | 2018137108 | A1 | | 8/2018 | |
| WO | 2018148967 | A1 | | 8/2018 | |

OTHER PUBLICATIONS

Chinese Office Action for Application No. 202010242653.6; dated Nov. 15, 2022; 7 Pages.

European Examination Report for Application No. 20167000.7; dated Dec. 21, 2022; 6 Pages.

Indian Office Action for Application No. 202014012920; dated Aug. 10, 2021; 6 Pages.

* cited by examiner

PROCESSING SERVICE REQUESTS IN A CONVEYANCE SYSTEM

BACKGROUND

The embodiments herein relate to the field of conveyance systems, and more particularly, to processing conveyance system service requests.

Users of conveyance systems, such as, for example, elevator systems, escalator systems, and moving walkways, may submit a service request to indicate an issue with the conveyance system. For example, a passenger of an elevator system may contact a maintenance provider to report that an elevator car is not running, a light is out, excessive noise, a blocked call button, etc. In some cases, a maintenance person is dispatched to address the service request and it is determined that the conveyance system is operating properly (referred to as "running on arrival").

SUMMARY

According to an embodiment, a method of processing a service request related to a conveyance system includes receiving the service request related to the conveyance system; determining whether the service request identifies the conveyance system as running or not running; upon determining that the service request identifies the conveyance system as not running: determining whether a conveyance system status is accessible; when the conveyance system status is accessible, determining from the conveyance system status whether the conveyance system is operating properly; when the conveyance system status is not accessible, obtaining at least one input from the conveyance system and determining from the at least one input whether the conveyance system is operating properly.

In addition to one or more of the features described herein, or as an alternative, further embodiments may include wherein upon determining that the service request identifies the conveyance system as running, determining if the service request identifies at least one issue.

In addition to one or more of the features described herein, or as an alternative, further embodiments may include wherein upon determining that the service request identifies at least one issue, initiating a service call for the conveyance system.

In addition to one or more of the features described herein, or as an alternative, further embodiments may include wherein the service call is associated with a low priority.

In addition to one or more of the features described herein, or as an alternative, further embodiments may include wherein upon determining, from the conveyance system status, that the conveyance system is not operating properly, initiating a service call for the conveyance system.

In addition to one or more of the features described herein, or as an alternative, further embodiments may include wherein the service call is associated with a high priority.

In addition to one or more of the features described herein, or as an alternative, further embodiments may include wherein determining from the at least one input whether the conveyance system is operating properly comprises applying machine intelligence to the at least one input.

In addition to one or more of the features described herein, or as an alternative, further embodiments may include wherein the at least one input is obtained from at least one sensor installed at the conveyance system.

In addition to one or more of the features described herein, or as an alternative, further embodiments may include wherein the at least one sensor comprises one or more of a light sensor, a door sensor, a motion sensor, a microphone and level sensor and an acceleration sensor.

In addition to one or more of the features described herein, or as an alternative, further embodiments may include wherein the light sensor measures light levels within an elevator car to indicate that lighting in the elevator car is operating properly.

In addition to one or more of the features described herein, or as an alternative, further embodiments may include wherein the door sensor measures elevator car door motion to indicate that an elevator car door is operating properly.

In addition to one or more of the features described herein, or as an alternative, further embodiments may include wherein the motion sensor measures motion in and out of an elevator car to indicate that the conveyance system is operating properly.

In addition to one or more of the features described herein, or as an alternative, further embodiments may include wherein the microphone detects sound in an elevator car to indicate that the conveyance system is operating properly.

In addition to one or more of the features described herein, or as an alternative, further embodiments may include wherein the acceleration sensor detects movement of an elevator car to indicate that the conveyance system is operating properly.

In addition to one or more of the features described herein, or as an alternative, further embodiments may include wherein the at least one input comprises human feedback.

In addition to one or more of the features described herein, or as an alternative, further embodiments may include wherein the conveyance system comprises an elevator system.

In addition to one or more of the features described herein, or as an alternative, further embodiments may include wherein the service request is received from a passenger of the conveyance system.

In addition to one or more of the features described herein, or as an alternative, further embodiments may include wherein the service request is received from the passenger by at least one of a telephone call, a text message and an online request.

According to another embodiment, a computer program product for processing a service request related to a conveyance system, the computer program product comprising a non-transitory computer readable storage medium having program instructions embodied therewith, the program instructions executable by a processor to cause the processor to implement operations including: receiving the service request related to the conveyance system; determining whether the service request identifies the conveyance system as running or not running; upon determining that the service request identifies the conveyance system as not running: determining whether a conveyance system status is accessible; when the conveyance system status is accessible, determining from the conveyance system status whether the conveyance system is operating properly; when the conveyance system status is not accessible, obtaining at least one input from the conveyance system and determining from the at least one input whether the conveyance system is operating properly.

Technical effects of embodiments of the present disclosure include the ability to process a service request related to a conveyance system and determine whether to initiate a service call based on one or both of system status and one or more inputs.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
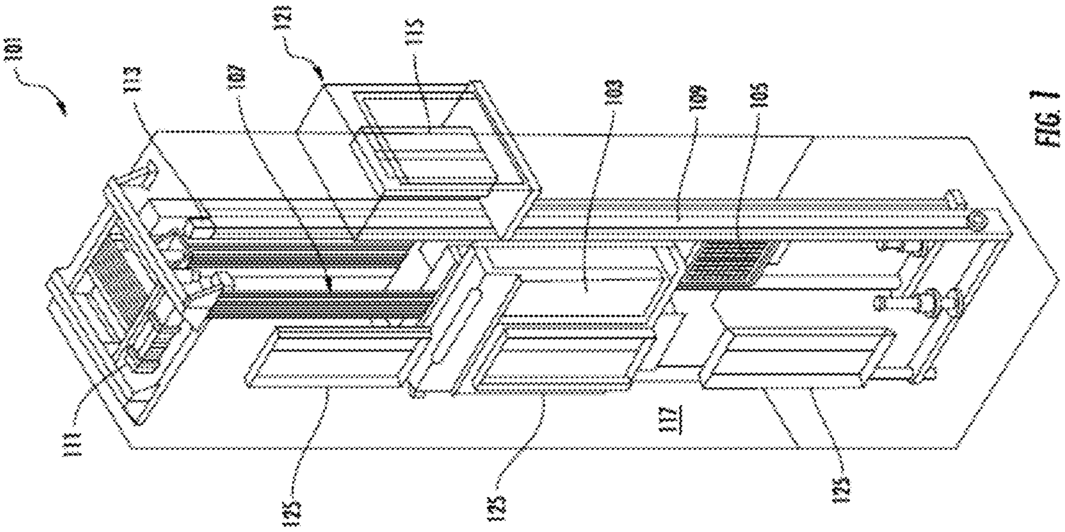
FIG. 1 depicts an elevator system that may employ various embodiments of the present disclosure.

FIG. 1 is a perspective view of a conveyance system in the form of an elevator system 101 including an elevator car 103, a counterweight 105, a tension member 107, a guide rail 109, a machine 111, a position reference system 113, and an elevator controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The elevator controller 115 is located, as shown, in a controller room 121 of the elevator hoistway 117 and is configured to control the operation of the elevator system 101, and particularly the elevator car 103. For example, the elevator controller 115 may provide drive signals to the machine 111 to control the acceleration, deceleration, leveling, stopping, etc. of the elevator car 103. The elevator controller 115 may also be configured to receive position signals from the position reference system 113 or any other desired position reference device. When moving up or down within the elevator hoistway 117 along guide rail 109, the elevator car 103 may stop at one or more landings 125 as controlled by the elevator controller 115. Although shown in a controller room 121, those of skill in the art will appreciate that the elevator controller 115 can be located and/or configured in other locations or positions within the elevator system 101. In one embodiment, the elevator controller 115 may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance system component such as an elevator car 103 of the elevator system 101. In another example, embodiments disclosed herein may be applicable conveyance systems such as an escalator system and a conveyance system component such as a moving stair of the escalator system.

Figure 2:
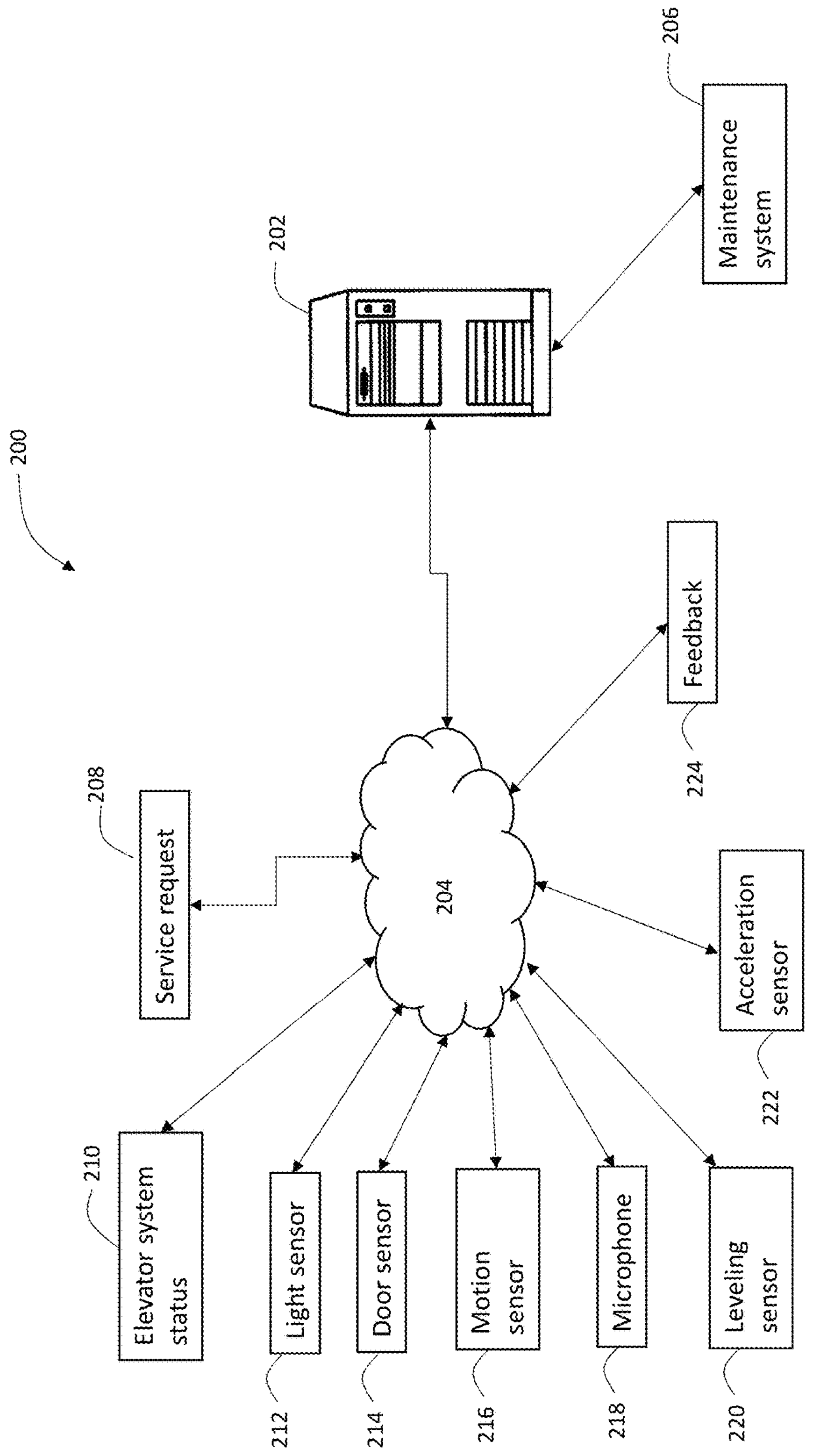
FIG. 2 depicts a service system and associated inputs in an example embodiment.

FIG. 2 depicts a service system 200 in an example embodiment. The service system 200 operates to determine if a service call should be initiated in response to a service request. The service system 200 includes a classification server 202 that processes service requests as either requiring a service call or not requiring a service call. The classification server 202 may be implemented using a processor-based machine such as a computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system (e.g., cloud computing), and/or a consumer electronic device.

The classification server 202 receives one or more inputs over a network 204. The classification server 202 determines if a service call is needed based on the one or more inputs. The network 204 may be implemented via one or more wired and/or wireless networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, BLE WiFi, enOceaon, Ingenu, weightless, enocean, thread, Zigbee, Zwave Fixed Wireless Data, 2G, 2.5G, 3G (e.g., WCDMA/UMTS based 3G networks), 4G, LoRaWAN, Sigfox, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

In operation, the classification server 202 receives a service request 208, which may be submitted by a user placing a telephone call, text message, online request, etc. The classification server 202 determines if a service call is needed in response to the service request 208. If a service call is needed, the classification server 202 may contact a maintenance system 206 with a message that initiates a service call in response to the service request 208. The classification server 202 may communicate with the maintenance system 206 over network 204, or over a separate wired and/or wireless connection. The maintenance system 206 may be implemented using a processor-based machine such as a computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system (e.g., cloud computing), and/or a consumer electronic device.

In determining whether to initiate a service call, the classification server 202 considers one or more inputs. Inputs to the classification server 202 include the service request 208. The service request 208 may be submitted by a user of the elevator system and will include at least one issue (elevator car is not running, a light is out, excessive noise, blocked call button, etc.). Inputs to the classification server 202 may include an elevator system status 210. The elevator system status 210 may include codes such as normal, idle, parked, shutdown, etc. The elevator system status 210 can be retrieved from the elevator controller 115 (or a database populated by the elevator controller 115) if the classification server 202 has access to the elevator controller 115. The elevator system status 210 may also be received from a sensor(s) associated with the elevator system, but not physically part of the system or the elevator controller 115. In some situations, the entity responsible for service of the elevator system 101 cannot access the elevator controller 115, and thus cannot access the elevator system status 210.

Inputs to the classification server 202 may include in-car light level measured by a light sensor 212 located in the elevator car 103. The in-car light level can be used to determine if lighting in the car is operating properly and/or if the elevator car doors are opening.

Inputs to the classification server 202 may include elevator car door motion measured by a door sensor 214 located at the elevator car 103. The elevator car door motion can be used to determine if the elevator car 103 is operating normally, as regular opening and closing of the elevator car doors is indicative of proper operation of the elevator system 101. Motion of the elevator car doors may be used with other inputs, such as an acceleration sensor, edge computing status, a health score, a floor level of the door by height sensor (e.g., air pressure sensor), etc. to determine if the elevator system 101 is operating properly.

Inputs to the classification server 202 may include motion inside the elevator car 103 measured by a motion sensor 216 located in the elevator car 103. Motion in and out of the elevator car 103 can be used to determine if the elevator car 103 is operating normally, as regular movement of passengers and/or cargo in and out of the elevator car 103 is indicative of proper operation of the elevator system 101. The motion sensor 206 may be implemented using one or more of a two dimensional camera, three dimensional camera, passive infrared sensor, ultrasonic speaker, microphone, etc.

Inputs to the classification server 202 may include sound inside the elevator car 103 measured by a microphone 218 located in the elevator car 103. The measured sound may include passenger sound or car operational sound (e.g., doors closing/opening). Passenger sound within normal levels is indicative of proper operation of the elevator system 101. Car operational sound within normal levels is indicative of proper operation of the elevator system 101.

Inputs to the classification server 202 may include car location measured by a leveling sensor 220 located on the elevator car 103. The leveling sensor 220 can detect a landing at which the elevator car 103 is located. If the elevator system 101 is operating properly, the leveling sensor 220 should indicate that the elevator car 103 is traversing floors in a normal fashion. The height of the elevator car 103 may be detected by an air pressure sensor, correct leveling (accuracy) by magnetic sensors or car leveling sensors, as described in co-pending U.S. patent application Ser. No. 16/164,226.

Inputs to the classification server 202 may include motion of the elevator car 103 measured by an acceleration sensor 222 located on the elevator car 103. The acceleration sensor 222 can detect acceleration of the elevator car 103, which can be processed to derive speed and direction of the elevator car 103. The acceleration sensor 222 may be implemented using an air pressure sensor. If the elevator system 101 is operating properly, the acceleration sensor 222 should indicate that the elevator car 103 is traveling up and down the hoistway 117 in a typical manner. The acceleration sensor 222 may be implemented using the same sensor that measures door movement, namely door sensor 214.

Inputs to the classification server 202 may include feedback 224, which may be provided by a person, such as a service person. The feedback 224 may be used to adjust decision making by the classification server 202. For example, a service person may be sent on a service call to the elevator system 101 to investigate a faulty button in a car operating panel. The service person may determine that the button was not faulty, but rather the user did not have access to the floor in question (e.g., a VIP floor). Feedback 224 from the service person may be used to reduce future service calls for the same issue in the future.

Figure 3:
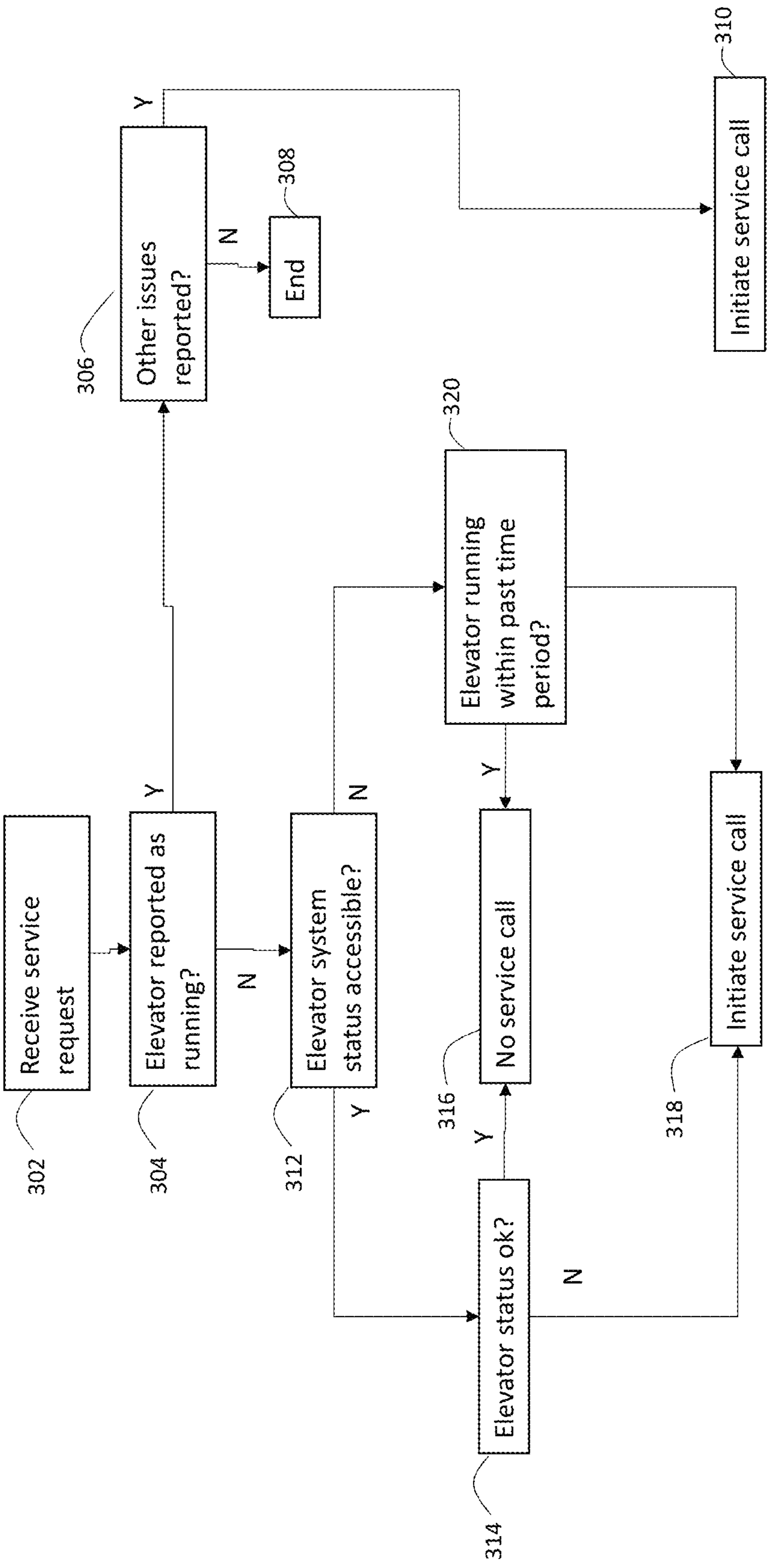
FIG. 3 depicts a process of processing a service request in an example embodiment.

FIG. 3 depicts a process of classifying a service request in an example embodiment. The process begins at 302 where a service request is received at the classification server 202. The service request may be initiated by a user placing a telephone call, text message, online request, email, etc. At 304, a determination is made if the service request identifies the elevator system 101 as running or not. The elevator system 101 is considered running if the elevator car 103 is moving between floors and the elevator doors open and close. If the service request is submitted by phone, a human receiving the call may need to provide data to the classification server 202 indicating the running status of the elevator system 101. Alternatively, the classification server 202 may present the requestor of the service request with options to select through an automated call menu or automated text message prompts. If the service request is submitted via an online menu, the requestor can select options to indicate if the elevator system 101 is running or not.

If the elevator system 101 is running, flow proceeds to 306 where a determination is made if issues other than the elevator system 101 not running are contained in the service request 208. Such issues may be, for example, a light out, excessive noise, a blocked call button, etc. If additional issues are present, flow proceeds to 310 where a service call is initiated. The classification server 202 may initiate the service call by sending a message to the maintenance system 206 indicating the location, issues, priority, etc. The service call at block 310 may be assigned a low priority, as the elevator system 101 is running. If no issues are identified at 306, the process ends at 308.

If at 304, the elevator system 101 is reported as not running, flow proceeds to 312 where the classification server 202 determines if access to the elevator system status 210 is available. If access to the elevator system status 210 is available, flow proceeds to 314 where the classification server 202 examines the elevator system status 210 to determine if the elevator system 101 is operating properly. This may be performed by examining status codes in the elevator system status 210. For example, status codes indicating normal operation or idle operation indicate that the elevator system 101 is operating properly. Codes indicating a stoppage or other faults indicate that the elevator system 101 is not operating properly. If at 314 the elevator system 101 is determined to be operating properly, flow proceeds to 316 where no service call is needed and the process terminates. At 316, the classification server 202 may use one or more inputs (e.g., sensor data) to verify that the elevator system 101 is operating properly.

If at 314, the elevator system 101 is determined to not be operating properly, flow proceeds to 318 where a service call is initiated. The classification server 202 may initiate the service call by sending a message to the maintenance system 206 indicating the location, issues, priority, etc. The service call at block 318 may be assigned a high priority, as the elevator system 101 is not running.

If at 312 the elevator system status 210 is not available, flow proceeds to 320 where the classification server 202 determines if the elevator system 101 has been running within a past time period (e.g., 30 minutes) and thus is operating properly. The classification server 202 uses the one or more inputs of FIG. 2 to determine if the elevator system 101 has been running within a past time period. The classification server 202 may use machine intelligence to dynamically determine if the elevator system 101 has been running within the past time period. Such techniques may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

For example, the classification server 202 may detect that the elevator car doors are opening/closing based on the door sensor 214, the elevator car 103 is moving up and down the hoistway 117 based on the acceleration sensor 222 and motion is detected periodically in the elevator car 103 based on the motion sensor 216. These inputs indicate that the elevator system 101 is running. If at 320, the classification server 202 determines that the elevator system 101 is running within the past time period, the elevator system 101 is determined to be operating properly and flow proceeds to 316 where no service call is needed and the process terminates. If at 320, the classification server 202 determines that the elevator system has not been running within the past time period, flow proceeds to 318 where a service call is initiated. The classification server 202 may initiate the service call by sending a message to the maintenance system 206 indicating the location, issues, priority, etc. The service call at block 318 may be assigned a high priority, as the elevator system 101 is not running.

Embodiments provide techniques to classify service requests and reduce running on arrival situations. Embodiments reduce wasted service calls and improve customer satisfaction by focusing on service requests that are directed to actual issues.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described above, embodiments can be in the form of processor-implemented processes and devices for practicing those processes. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, subcombinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of processing a service request related to a conveyance system, the method comprising:

receiving the service request related to the conveyance system;

determining whether the service request identifies the conveyance system as running or not running;

upon determining that the service request identifies the conveyance system as not running:

determining whether a conveyance system status is accessible;

when the conveyance system status is accessible, determining from the conveyance system status whether the conveyance system is operating properly;

when the conveyance system status is not accessible, obtaining at least one input from the conveyance system and determining from the at least one input whether the conveyance system is operating properly.

2. The method of claim 1 wherein:

upon determining that the service request identifies the conveyance system as running, determining if the service request identifies at least one issue.

3. The method of claim 2 wherein:

upon determining that the service request identifies at least one issue, initiating a service call for the conveyance system.

4. The method of claim 3 wherein:

the service call is associated with a low priority.

5. The method of claim 1 wherein:

upon determining, from the conveyance system status, that the conveyance system is not operating properly, initiating a service call for the conveyance system.

6. The method of claim 5 wherein:

the service call is associated with a high priority.

7. The method of claim 1 wherein:

determining from the at least one input whether the conveyance system is operating properly comprises applying machine intelligence to the at least one input.

8. The method of claim 1 wherein:

the at least one input is obtained from at least one sensor installed at the conveyance system.

9. The method of claim 8 wherein:

the at least one sensor comprises one or more of a light sensor, a door sensor, a motion sensor, a microphone and level sensor and an acceleration sensor.

10. The method of claim 9 wherein the light sensor measures light levels within an elevator car to indicate that lighting in the elevator car is operating properly.

11. The method of claim 9 wherein the door sensor measures elevator car door motion to indicate that an elevator car door is operating properly.

12. The method of claim 9 wherein the motion sensor measures motion in and out of an elevator car to indicate that the conveyance system is operating properly.

13. The method of claim 9 wherein the microphone detects sound in an elevator car to indicate that the conveyance system is operating properly.

14. The method of claim 9 wherein the acceleration sensor detects movement of an elevator car to indicate that the conveyance system is operating properly.

15. The method of claim 1 wherein:

the at least one input comprises human feedback.

16. The method of claim 1 wherein:

the conveyance system comprises an elevator system.

17. The method of claim 1 wherein:

the service request is received from a passenger of the conveyance system.

18. The method of claim 17 wherein:

the service request is received from the passenger by at least one of a telephone call, a text message and an online request.

19. A computer program product for processing a service request related to a conveyance system, the computer program product comprising a non-transitory computer readable storage medium having program instructions embodied therewith, the program instructions executable by a processor to cause the processor to implement operations comprising: receiving the service request related to the conveyance system;

determining whether the service request identifies the conveyance system as running or not running;

upon determining that the service request identifies the conveyance system as not running:

determining whether a conveyance system status is accessible;

when the conveyance system status is accessible, determining from the conveyance system status whether the conveyance system is operating properly;

when the conveyance system status is not accessible, obtaining at least one input from the conveyance system and determining from the at least one input whether the conveyance system is operating properly.

* * * * *